United States Patent [19]

Hirano

[11] 4,135,250
[45] Jan. 16, 1979

[54] SYSTEM FOR CLEARING INPUT DATA IN ELECTRONIC COMPUTER

[75] Inventor: Reiji Hirano, Yokohama, Japan

[73] Assignee: Canon Kabushiki Kaisha, Tokyo, Japan

[21] Appl. No.: 760,256

[22] Filed: Jan. 18, 1977

[30] Foreign Application Priority Data

Jan. 28, 1976 [JP] Japan .................................. 51-8094

[51] Int. Cl.² .................. G06F 15/02; G06F 15/32
[52] U.S. Cl. ................................... 364/900; 364/709
[58] Field of Search ............... 235/156, 152; 364/709, 364/200 MS File, 900 MS File

[56] References Cited

U.S. PATENT DOCUMENTS

| | | | |
|---|---|---|---|
| 3,924,110 | 12/1975 | Cochran et al. | 364/900 |
| 3,979,057 | 9/1976 | Katz et al. | 235/156 |

*Primary Examiner*—Gareth D. Shaw
*Assistant Examiner*—Thomas M. Heckler
*Attorney, Agent, or Firm*—Fitzpatrick, Cella, Harper & Scinto

[57] ABSTRACT

In an electronic computer of the type having a keyboard having numeral keys and data instruction keys and storage means for storing data entered by the keyboard, a clear key is provided which, upon depression, initiates the operation for clearing only the data stored in the storage means after the depression of the data instruction key when the clear key is depressed immediately after the entry of data or for clearing all the data so far stored in the storage means when the clear key is depressed immediately after the depression of the data instruction key. Upon depression of the clear key, the data only in specified digits in storage means may be cleared or erased.

3 Claims, 8 Drawing Figures

FIG. 5

| KEY OPERATION | DISPLAY REGISTER DR | INTERNAL REGISTER IR |
|---|---|---|
| 12 | 12. | 0. |
| [H] | 12. 00. 00. | 12. 00. 00. |
| 34 | 34. | 12. 00. 00. |
| [M] | 12. 34. 00. | 12. 34. 00. |
| 56 | 56. | 12. 34. 00. |
| [CI] | 0. | 12. 34. 00. |
| 45 | 45. | 12. 34. 00. |
| [S] | 12. 34. 45. | 12. 34. 45. |

FIG. 6

| KEY OPERATION | DISPLAY REGISTER DR | INTERNAL REGISTER IR |
|---|---|---|
| 12 | 12. | 0. |
| [H] | 12. 00. 00. | 12. 00. 00. |
| 34 | 34. | 12. 00. 00. |
| [M] | 12. 34. 00 | 12. 34. 00. |
| 56 | 56. | 12. 34. 00. |
| [S] | 12. 34. 56. | 12. 34. 56. |
| [CI] | 0. | 0. |
| 10 | 10. | 0. |
| [H] | 10. 00. 00. | 10. 00. 00. |

FIG. 7

| KEY OPERATION | DISPLAY REGISTER DR | INTERNAL REGISTER IR | OPERATION REGISTER OR |
|---|---|---|---|
| 12 | 12. | 0. | 0. |
| [H] | 12. 00. 00. | 12. 00. 00. | 0. |
| 34 | 34. | 12. 00. 00. | 0. |
| [M] | 12. 34. 00. | 12. 34. 00. | 0. |
| [+] | 12. 34. 00. | 12. 34. 00. | 12. 34. 00. |
| 11 | 11. | 0. | 12. 34. 00. |
| [H] | 11. 00. 00. | 11. 00. 00. | 12. 34. 00. |
| 10 | 10. | 11. 00. 00. | 12. 34. 00. |
| [Cl] | 0. | 11. 00. 00. | 12. 34. 00. |
| 42 | 42. | 11. 00. 00. | 12. 34. 00. |
| [M] | 11. 42. 00. | 11. 42. 00. | 12. 34. 00. |
| [=] | 24. 46. 00. | 11. 42. 00. | 12. 34. 00. |

FIG. 8

| KEY OPERATION | DISPLAY REGISTER DR | INTERNAL REGISTER IR | OPERATION REGISTER OR |
|---|---|---|---|
| 12 | 12. | 0. | 0. |
| [H] | 12. 00. 00. | 12. 00. 00. | 0. |
| 34 | 34. | 12. 00. 00. | 0. |
| [M] | 12. 34. 00. | 12. 34. 00. | 0. |
| [+] | 12. 34. 00. | 12. 34. 00. | 12. 34. 00. |
| 11 | 11. | 0. | 12. 34. 00. |
| [H] | 11. 00. 00. | 11. 00. 00. | 12. 34. 00. |
| 10 | 10. | 11. 00. 00. | 12. 34. 00. |
| [M] | 11. 10. 00. | 11. 10. 00. | 12. 34. 00. |
| [CI] | 0. | 0. | 12. 34. 00. |
| 21 | 21. | 0. | 12. 34. 00. |
| [H] | 21. 00. 00. | 21. 00. 00. | 12. 34. 00. |
| 42 | 42. | 21. 00. 00. | 12. 34. 00. |
| [M] | 21. 42. 00. | 21. 42. 00. | 12. 34. 00. |
| = | 34. 16. 00. | 21. 42. 00. | 12. 34. 00. |

SYSTEM FOR CLEARING INPUT DATA IN ELECTRONIC COMPUTER

BACKGROUND OF THE INVENTION

Where a desk-top electronic calculator or computer carries out a particular calculation such as a time data calculation, angle data calculation, a mis-entry correction of input data has to be done by a different correcting manner from the conventional correcting manner, since the input data, such as time, comprises different dimensions of data such as hour, minute and second, and each of which is also given by different number systems, such as a bidecimal notation, and a sixty-base notation. For instance, in time data calculation the following input data clearings or corrections are required:

(1) With entered data of 12 o'clock (hours) 34 minutes 56 seconds, time in seconds; that is, 56 seconds must be corrected to 45 seconds;

(2) With entered data of 12 o'clock (hours) 34 minutes 56 seconds, the whole input data must be cleared or erased;

(3) Where an augend 12 o'clock (hours) 34 minutes and addend 11 o'clock 42 minutes are added, if the augent 12 o'clock 34 minutes is entered, and an operation instruction is present, and then addend 11 o'clock 10 minutes is mis-entered, only 10 minutes in the addend must be corrected to 42 minutes; and (4) With the augend and addend entered as (3), the whole input data must be cleared or erased.

The primary object of the present invention is therefore to provide a system for clearing desired data by the depression of only one clear key.

Another object of the present invention is to provide a system for·clearing the specified data of a series of input data by depressing the clear key.

SUMMARY OF THE INVENTION

In accordance with the present invention, a system for clearing input data in an electronic computer comprises keyboard entry means having numeral keys, functional keys, data insturction keys, and a clear key; storage means for storing data entered by said keyboard entry means; and control means responsive to the depression of said clear key after the entry of data for clearing the data stored in said storage means immediately after the depresssion of one of said data instruction keys, or responsive to the depression of said clear key after the depression of one of said data instruction keys for clearing all data so far stored in said storage means.

BRIEF DESCRIPTION OF THE DRAWING

The present invention will become more apparent from the following description of one preferred embodiment thereof taken in conjunction with the accompanying drawings, in which:

FIGS. 5 - 8 are examples of clear operations.

DESCRIPTION OF THE PREFERRED EMBODIMENT

Figure 1:
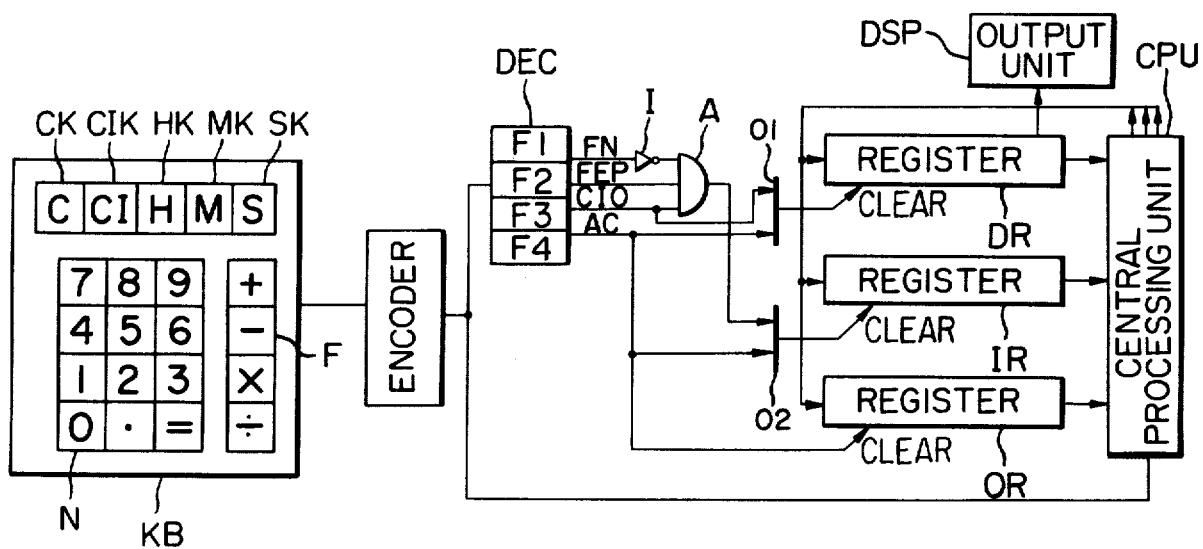
FIG. 1 is a block diagram of a preferred embodiment of the present invention.

Referring to FIG. 1, a keyboard KB has numeral or digit keys N, functional keys F, an equal key, an all-clear key CK, a display register clear key CIK, and data instruction keys HK, MK and SK for separating the input data into hours, minutes and seconds. The system in accordance with the present invention further includes an encoder ENC, a decision circuit DEC consisting of flip-flops F1 - F4, a display register DR, an internal register IR, an operation register OR, a central processing unit CPU and a display or printer DSP.

The flip-flop F1 in the decision circuit is reset when a user pushes the all-clear key CK, data instruction keys H, M and S or functional keys F or the flip-flop F1 is reset in response to the halt instruction. It is set in response to the first entry of a numeral data after the all-clear key has been depressed or in response to the first entry of a numeral data after one of the functional keys F has been depressed. A set signal FN is transmitted through an inverter I to a three-input AND gate A.

The flip-flop 2 is reset in response to the halt instruction or when the user depresses the all-clear key CK or one of the functional keys F, and is set in response to the first entry of a numeral data after the all-clear key has been depressed or in response to the first depression of one of the data instruction keys HK, MK and SK after one of the functional keys F has been depressed. A set signal FEP is directly applied to the AND gate A.

The flip-flops F3 and F4 are set, respectively, when the display clear key CIK and the all clear key CK are depressed.

Figure 2:
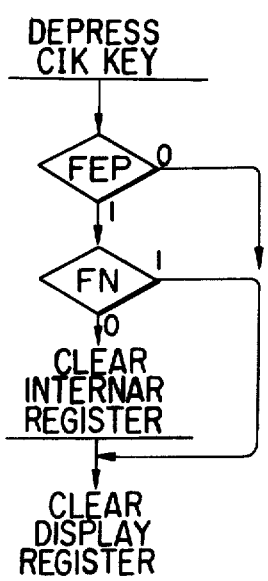
FIG. 2 is a flow chart used for the explanation of the underlying principle of the present invention.

Next referring to FIG. 2, the display-clear key CIK will be described in detail. Upon depression of the key CIK, the flip-flop F3 is set, giving the signal CIO=1. When one of the functional keys F has been already depressed before the display-clear key CIK is depressed, the flip-flop F2 is set, giving the signal FEP=1. The flip-flop F1 is reset, giving the signal FN=0 when no data entry has been made. Therefore the AND gate A is opened to clear the internal register IR. The signal CIO is also transmitted to an OR gate 01 so that the display register DR is cleared. With the signals FEP=1 and FN=1, only the display register DR is cleared. With FEP=0, only the display register DR is cleared regardless FN=1 or 0.

Figure 3:
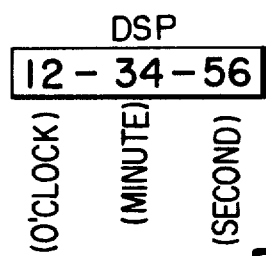
FIGS. 3 and 4 show input data or time appearing in a display.
Figure 4:
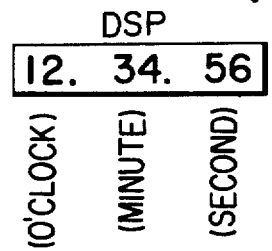

The contents in the display register DR appear in the display DSP as shown in FIG. 3 or 4. That is, the contents in the display register DR are " 1 2 3 4 5 6 " in this example, and in the display DSP time or two-digit figures in hours, minutes and seconds are separated by hyphens or dots.

Next referring to FIGS. 5 - 8, the mode of operation will be described. In FIG. 5 there are shown steps for correcting 56 seconds of an input data of 12 hours 34 minutes 56 seconds to 45 seconds. Immediately before the Display-Clear key CI is depressed, under the control of the central processing unit CPU, data 56 (seconds) are stored in the display register DR whereas 12 (hours) 34 (minutes), in the internal register IR. Since FN=1 and FEP=1, AND gate A remains closed so that upon depression of Display-Clear key CIK only the contents in the display register DR are cleared. Then the user may enter the correct data 45 and depresses the key SK.

FIG. 6 shows an example for clearing all input data. That is, the data 12 hours 34 minutes 56 seconds are to be cleared and a new data 10 hours 00 minutes 00 seconds are to be entered. Since the first data are entered by a sequence of keystrokes or key operations of 12·H·3-4·M·56·S, FN=0 and FEP=1. Therefore upon depression of Display-Clear key CIK, both the display and internal registers DR and IR are cleared so that the new data may be entered by the key operations of 10 H.

It should be noted that in the first example shown in FIG. 5, Display-Clear key CIK is depressed before Second key SK is depressed while in the second example shown in FIG. 6 Display-Clear key CIK is depressed after Second key SK has been depressed. That is, when Display-Clear key CIK is depressed before one of the data instruction keys HK, MK and SK is depressed, the data which have been entered after the higher-order data instruction key HK or MK was depressed are cleared, but the data in the internal register remain unchanged and the instruction activated by the depression of the higher-order instruction key HK or MK is executed. On the other hand, when the Display-Clear key CIK is depressed after one of the data instruction keys has been depressed, both the display and internal registers DR and IR are cleared, and the instructions activated by the depression of the data instruction keys are not executed.

FIG. 7 shows an example of Case (3) described above. That is, an augend 12 hours 34 minutes was entered, the functional key or add key + was depressed and an addend 11 hours 10 minutes was entered, and the user wants to correct 10 minutes of the addend to 42 minutes. This state corresponds to the state of the first example (FIG. 5) after one of the functional keys +, −, X and ÷ has been depressed so that only the display regiter DR is cleared.

In this example, as a result of key operations of 12·•H·34·M·+·11·H·10·CIK·42·M= , 24 hours 16 minutes is obtained and the augend 12 hours 34 minutes is stored in the operation register OR. Same is true for the subtraction, multiplication and division.

FIG. 8 shows an example of Case (4). That is, all input data including the instruction entered by the depression of one of the data instruction keys HK, MK and SK are to be cleared. That is, after having keyed in 12 hours 34 minutes + 11 hours 10 minutes =, the user wants to change the addend 11 hours 10 minutes to 21 hours 42 minutes. This state corresponds to that of the second example (FIG. 6) after one of the functional keys has been depressed. Therefore upon depression of Display-Clear key CIK after the depression of one of the data instruction keys HK, MK and SK, both the display and internal registers DR and IR are cleared.

In the same manner as that of the conventional decimal number system calculators or computers, all input data including an operand, operational instructions and an operator may be cleared by the depression of All-Clear key CK.

As with the difference between the first and second examples, in the third example (FIG. 7) Display-Clear key CIK is depressed before one of the data instruction keys HK, MK and SK is depressed whereas in the fourth example (FIG. 8) Display-Clear key CI is depressed after one of the data instruction keys has been depressed.

The above described system in accordance with the present invention is different from the conventional decimal number system computers in that it has a group of data instruction keys, an internal register used in time calculation and the display-clear key CIK of the type described in detail above.

So far the present invention has been described in conjunction with time, but it will be understood that the system of the present invention may be equally applied to the operation in degree, year-month-day and the like to cash registers handling money in various notation. Clearing or changing data may be accomplished by a minimum number of steps.

What I claim is:

1. A system for clearing input data in an electronic apparatus comprising:

input means having numeral keys, functional keys, data instruction keys, and a clear key;

output means for outputting the numeral data entered from said input means;

storage means for storing the numeral data entered from said input means, said storage means including a first register coupled to said output means, and a second register; and clear control means including memory means, said clear control means comprising a first clear control circuit for generating a signal to clear the contents of both said first and second registers in response to the key operation of said clear key when said memory means memorizes that any one of said data instruction keys is depressed, and a second clear control circuit for generating another signal to clear the content of said first register in response to the key operation of said clear key when said memory means memorizes that any one of said numeral keys is depressed.

2. A system acccording to claim 1, wherein means are provided whereby said data instruction keys have functions of applying the time dimension to the numeral data entered from said numeral keys, and of the conversion of the numeral data in the number system.

3. A system according to claim 1, including an electronic calculator capable of carrying out time calculation.

* * * * *